United States Patent [19]

Kawakatsu et al.

[11] 4,353,055
[45] Oct. 5, 1982

[54] ALARMING APPARATUS OF VEHICLE

[75] Inventors: Shiro Kawakatsu; Toshikazu Kawasaki, both of Suita, Japan

[73] Assignee: Daihatsu Motor Co., Ltd., Ikeda, Japan

[21] Appl. No.: 149,717

[22] Filed: May 14, 1980

[30] Foreign Application Priority Data

May 24, 1979 [JP] Japan .............................. 54-69748[U]
Aug. 15, 1979 [JP] Japan .............................. 54-113166[U]

[51] Int. Cl.³ ........................................... G08B 29/00
[52] U.S. Cl. ................................. 340/52 D; 340/52 F
[58] Field of Search ................. 340/52 D, 52 R, 52 F, 340/53, 149 R, 149 A, 151, 63, 64

[56] References Cited

U.S. PATENT DOCUMENTS 3,541,505 3/1968 Lee ......................................... 340/64

*Primary Examiner*—Alvin H. Waring
*Attorney, Agent, or Firm*—Darby & Darby

[57] ABSTRACT

A vehicle such as an automobile comprises various auxiliary devices for implementing auxiliary functions such as electrical equipment, windows, doors, a parking brake, a transmission and the like, in addition to a principal scheme for a running operation of the vehicle. The vehicle also comprises two alarms, one being provided for raising an alarm inside the vehicle and the other being provided for raising an alarm outside the vehicle. When a driver leaves the vehicle after he ends the drive, a predetermined undesired state of various auxiliary devices, such as a switch for the circuit of electrical equipment being kept turned on, the window or door being not fully closed, the parking brake being not put on and so on is detected, when the key switch is turned off. Upon detection of such undesired state, first the inside alarm is energized and after a predetermined time period the outside alarm is energized. As a result, it is ensured that a driver does not quit the vehicle with various devices in an undesired state.

25 Claims, 13 Drawing Figures

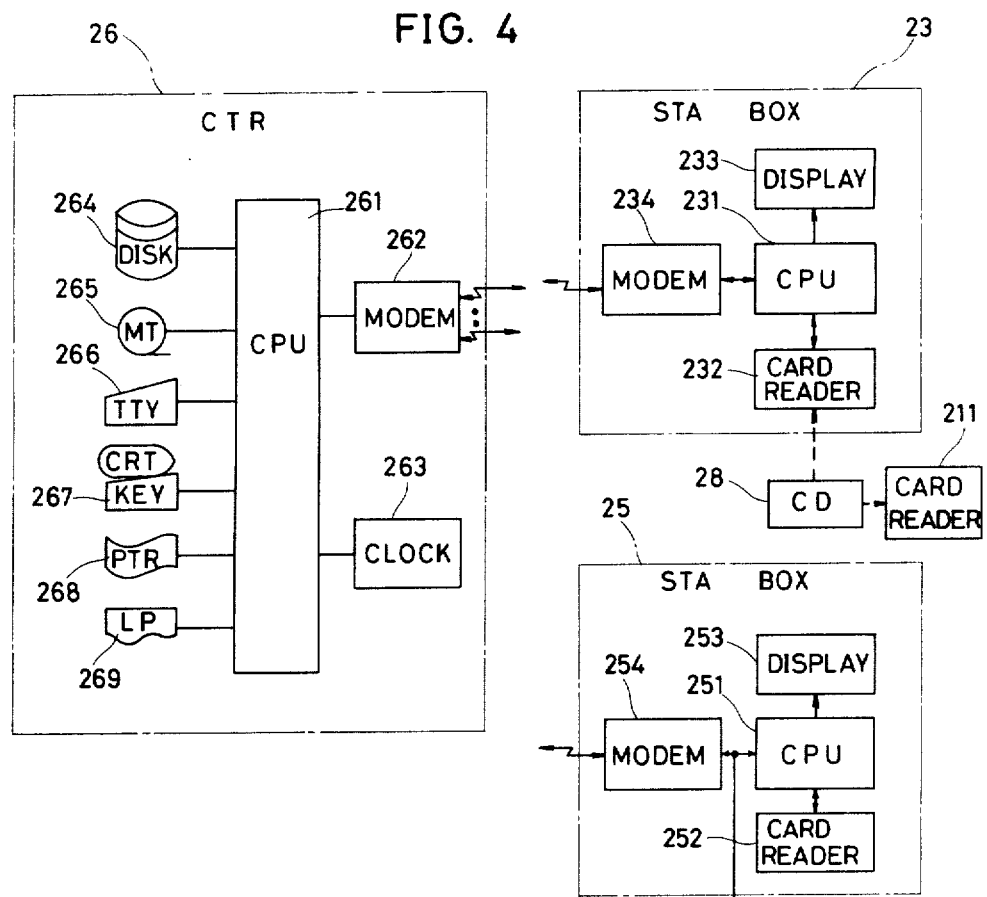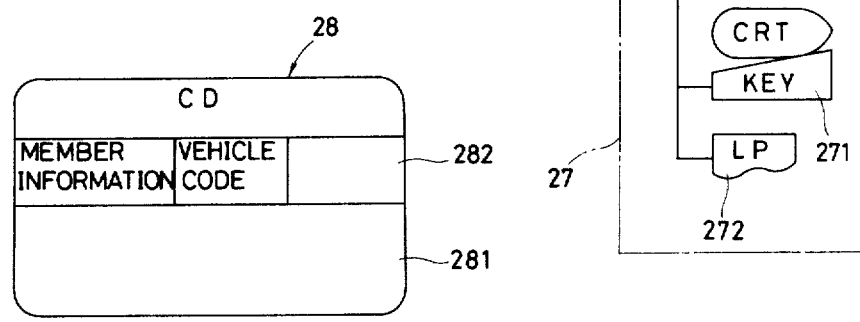

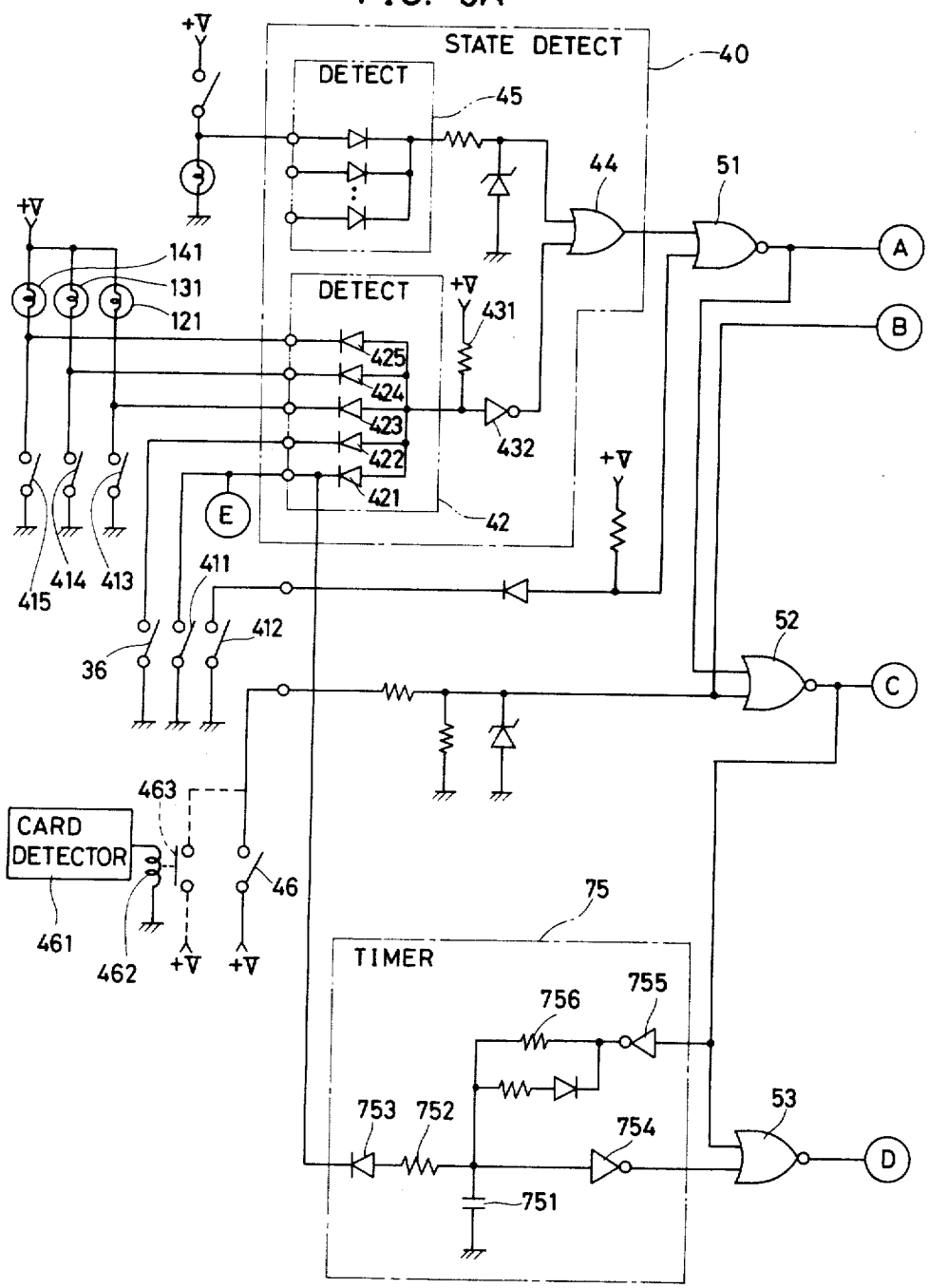

FIG. 9B
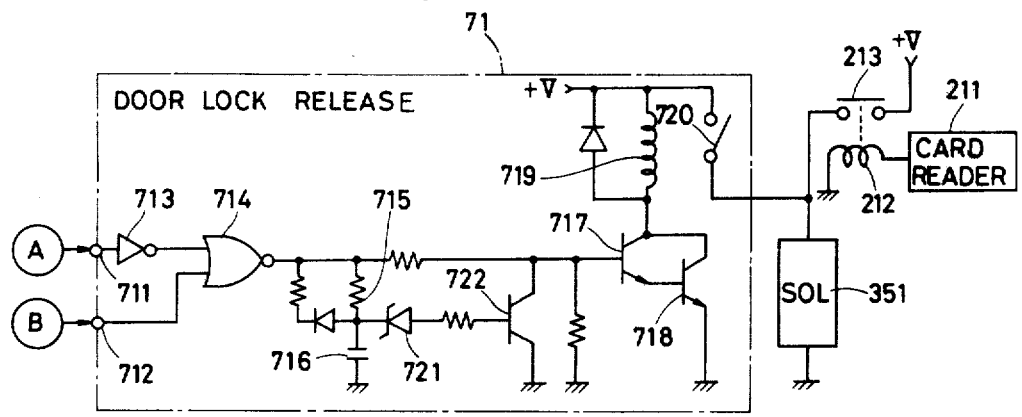
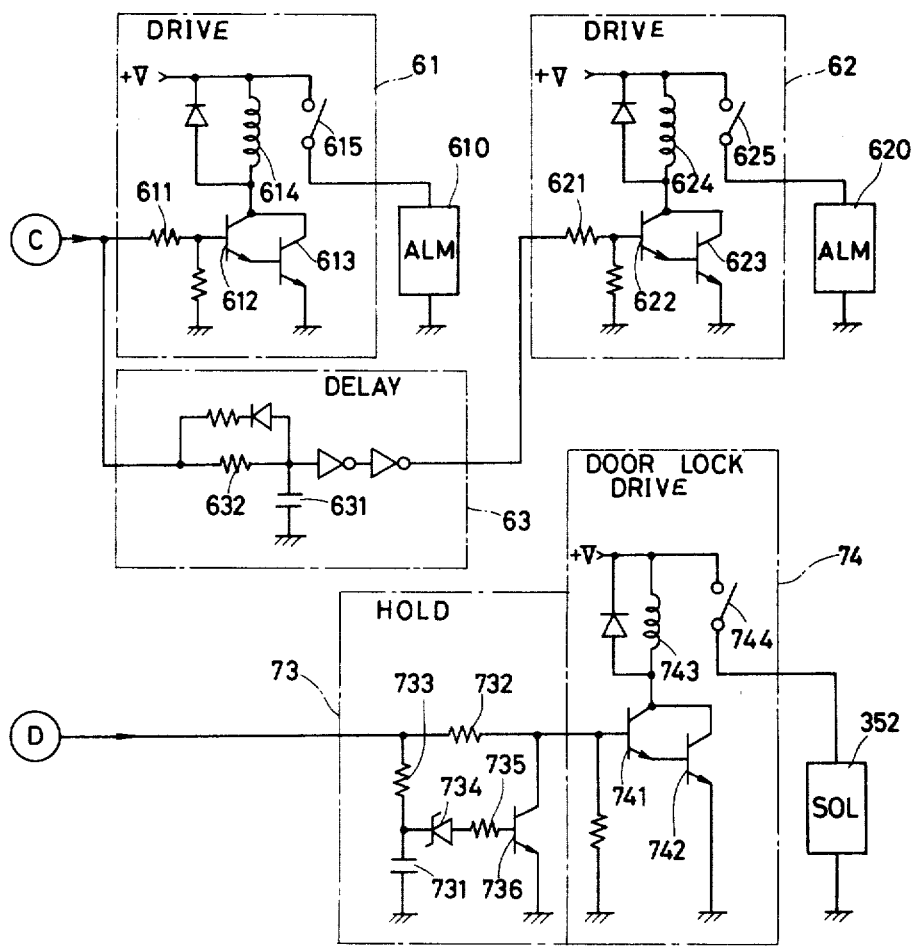

ALARMING APPARATUS OF VEHICLE

BACKGROUND OF THE INVENTION

1. Field of the Invention

The present invention relates to an alarming apparatus of a vehicle. More specifically, the present invention relates to an alarming apparatus for a vehicle such as an automobile including electrical equipment, doors, windows, a parking brake, a transmission and the like, wherein an alarm is raised upon detection of a predetermined undesired state being established on these devices after the vehicle is used, thereby to ensure that a driver brings such devices in a predetermined desired state.

2. Description of the Prior Art

As an example of a vehicle, an automobile can be classified as an engine automobile including an engine as a prime mover, an electric automobile including a motor as a prime mover, and a hybrid automobile including both an engine and a motor and adapted to be selectively driven by either of them. Such vehicles are provided with various types of electrical equipment for the purpose of safety of running of the vehicle. By the electrical equipment here, various types of lamps, for example, are meant which can be enabled or used as desired even after the so-called key switch for enabling the drive operation of the vehicle is turned off. Such lamps comprise headlights, sidelights, parking lights, turn signal lights, and so on. The electrical equipment is energized by a storage battery. However, if and when a driver neglects to turn off any one of the switches for such lamps when he leaves the vehicle after he ends the drive of the vehicle, the corresponding lamp is kept continually turned on, whereby the electric power is undesirably consumed. As a result, the storage battery could be overdischarged and problems could occur that a starter motor, a drive motor and the like are not started, the electrical equipment is not operative, and so on, when a driver is about to drive the vehicle next time. Therefore, it becomes necessary to provide an alarm to notify the circuit for the electrical equipment being not turned off, for the purpose of preventing the electrical equipment circuit from being not turned off.

FIG. 1 is a schematic diagram of a conventional negligence alarming apparatus for alarming negligence to turn off a circuit of the electrical equipment. Referring to FIG. 1, an outline of a conventional negligence alarming apparatus will be described. A series connection of a headlight 121 and a switch 122, a series connection of a sidelight 131 and a switch 132, and a series connection of a parking light 141 and a switch 142 are connected in parallel to a storage battery 11. Although not shown, other series connections of other various lamps and switches for switching the circuits of these lamps may be further connected in parallel to the storage battery 11, as necessary. The junction of the switch 122 and the headlight 121 is connected to the anode of a diode 123. Likewise, the output terminals of the switches 132 and 142 are connected to the anodes of the diodes 136 and 143. The cathodes of the diodes 123, 133 and 143 are commonly connected to one terminal of a buzzer 15. The other end of the buzzer 15 is connected through a seat switch 16 to the ground.

In operation, if and when a driver sits on a driver seat, the seat switch 16 is opened. Therefore, even when any one of the switches 122, 132 and 142 is closed to turn on the corresponding lamp when the vehicle is in a driving operation, the buzzer 15 is not energized and hence no alarm is raised. On the other hand, when the driver leaves the driver seat, the seat switch 16 is closed. If and when the driver neglects to open any one of the switches 122, 132 and 142, a voltage is applied from the storage battery 11 through the switch, say 122, which the driver neglected to open, and the corresponding diode (123) to the buzzer 15. As a result, the buzzer 15 is enabled to raise an alarm, whereby the driver is notified of his negligence to turn off a circuit for some electrical equipment.

Generally such buzzer 15 has been hitherto provided inside the vehicle. Therefore, according to such conventional negligence alarming apparatus as shown in FIG. 1, it could occur that when a driver leaves the vehicle to go outside upon failure to hear the alarm or without noticing the same the buzzer can be hardly heard from outside the vehicle and it is particularly so after the door is closed. Thus, there was some difficulty in completely preventing such negligence to turn off a circuit of electrical equipment. An alternative approach can be thought of in which an alarm is raised toward the outside of the vehicle utilizing a klaxon of the vehicle. However, since the sound of a klaxon is too large, utilization of a klaxon causes a trouble of too large a noise to the people in the neighborhood.

On the other hand, apart from the electrical equipment described above, the vehicle usually comprises various auxiliary devices performing auxiliary functions of the vehicle, such as doors, windows, a parking brake, a transmission, and the like, in addition to a principal scheme for driving the vehicle. In leaving the vehicle, if and when a driver neglects to completely close the door, the window, and the like, there is a much possibility of a theft. Accordingly, it is necessary to raise an alarm also in the case where negligence to close a door, window and the like occurs. Even in such a case, if an alarm is provided inside the vehicle so as to be raised when a driver leaves the vehicle without completely closing a door, such alarm can not be noticed by the driver in most cases. Furthermore, if a driver neglects to put a parking brake on on leaving the vehicle, an extremely dangerous situation occurs that the vehicle starts running undesirably and it is particularly so when the vehicle is parked on a slope. Therefore, it is also necessary to raise an alarm to the driver, when he neglects to put a parking brake on in parking the vehicle.

Meanwhile, apart from the usual cases where vehicles are owned by drivers themselves, for example, a rental system of vehicles has also been proposed wherein the vehicles are rented for any unspecified drivers. In such a rental system, the above discussed various problems are much more aggravated, inasmuch as the above described negligence to turn off a circuit of electrical equipment, negligence to completely close a door, and so on are more liable to occur. More specifically, in such a rental system the vehicles are still in the custody of the driver even when the driver ends his use of the vehicle and he leaves the vehicle. In such a situation, unless a driver turns off the switch of the electrical equipment after his usage of the vehicle, the circuit of the electrical equipment of the vehicle is kept turned on for a long time period until the next use by a different driver, which results in an overdischarge of the storage battery. Accordingly, in such a rental system, it is much more required to render various devices provided in the vehicle in a predetermined desired condition after the use of the vehicle.

Furthermore, in such rental system, since persons using the vehicle are not such a rental system, since the persons using the vehicles are not specified, there could occur a situation wherein a vehicle is parked with a transmission being rendered in the positions other than the neutral. In such a situation, a different driver using the vehicle next time often misunderstands that the transmission has been changed already to the neutral and depresses an accelerating pedal with such misunderstanding. In such a case, the vehicle abruptly dashes and such situation is extremely dangerous. Accordingly, in such a rental system, it is particularly required that the vehicle is parked while the transmission is returned to the neutral position.

SUMMARY OF THE INVENTION

In order to eliminate the above described problems, the present invention comprises first and second alarming means provided to raise an alarm inside and outside a vehicle, respectively. The first alarming means provided to raise an alarm inside the vehicle may comprise any of visual indicating means and audible sound producing means. The second alarming means provided to raise an alarm outside the vehicle comprises audible sound producing means. Using state selecting means such as a key switch is provided for selecting a using state or a non-using state of the vehicle, so that a non-using state of the vehicle may be selected when a driver leaves the vehicle. State detecting means is further provided for detecting a predetermined undesired state of an auxiliary device for implementing an auxiliary function of the vehicle, in addition to a principal scheme for driving the vehicle, which predetermined undesired state of the auxiliary device is not desired in the non-using state of the vehicle. The auxiliary device for implementing an auxiliary function of the vehicle comprises at least one of electrical equipment, a door openably/closably provided, a window openably/closably provided, a parking brake and a transmission. First control means is provided which is responsive to the state detecting means and the using state selecting means to enable the first alarming means when the predetermined undesired state is detected by the state detecting means and the non-using state is selected by the using state selecting means. As a result the driver is notified of the fact that the non-using state is selected in spite of the fact that the predetermined undesired state is has been established. Second control means is further provided for enabling the second alarming means a predetermined period of time after the first alarming means is enabled by the first control means. As a result, if and when the driver neglects to take any step to preclude the predetermined undesired state of the auxiliary device for implementing an auxiliary function of the vehicle, the second alarming means is enabled a predetermined period of time after the first alarming means is enabled by the first control means, whereby the driver is notified of the fact that the above described predetermined undesired state of the auxiliary device in the non-using state of the vehicle is still continuing even after the driver left the vehicle. Thus, the driver is reminded of his negligence to take any step to preclude the above described predetermined undesired state of the auxiliary device in the non-using state of the vehicle. Since the driver usually takes any necessary step to preclude such predetermined undesired state of the auxiliary device immediately, any undesired state of such device can be prevented.

The above described auxiliary device for implementing an auxiliary function of the vehicle comprises at least one of electrical equipment, a door openably/closably provided, a window openably/closably provided, a parking brake and a transmission. When the vehicle is not used, negligence to turn off a switch for selective energization of the electrical equipment, negligence to completely close a door or window, negligence to apply the parking brake, and/or negligence to bring the transmission to a neutral position or a parking position on the occasion of a non-using state of the vehicle is notified to the driver by enabling the first alarming means, whereby the driver is reminded of his negligence as described above. If and when the driver ignores the alarm by the first alarming means and leaves the vehicle without taking any step to preclude the above described predetermined undesired state of the auxiliary device, then another alarm is raised by the second alarming means a predetermined period of time after the first alarming means is enabled. If and when the auxiliary device for implementing an auxiliary function of the vehicle comprises a door openably/closably provided, and if and when the driver leaves the vehicle after he incompletely closes the door, the second alarming means is also enabled to raise an alarm. As a result, the driver is notified of any of the predetermined undesired state of the auxiliary device in the non-using state of the vehicle even after he left the vehicle.

In a preferred embodiment of the invention, the vehicle is structured to be responsive to an information medium bearing information associated with the vehicle for permitting the use of the vehicle. The information medium is adapted to contain information concerning permissibility of the use of vehicle. The vehicle may comprise a vehicle for rental the use of which is permitted based on the information concerning permissibility of the use of the vehicle contained in the information medium. The information medium may be further adapted to contain information concerning verification of the information medium. Verification determining means is provided for determining verification of the information medium based on the information concerning verification contained in the information medium. Enabling means is provided responsive to the verification determining means for enabling the use of the vehicle when the verification of the information medium is determined. If and when a driver neglects to take any step to preclude the predetermined undesired state of the auxiliary device when he leaves the vehicle, an alarm is raised first when he is in the vehicle and then after he left the vehicle and is outside the vehicle. As a result, the driver is notified of his negligence and is encouraged to take any step to preclude the above described predetermined undesired state of the auxiliary device. As a result, a control of vehicles for rental can be achieved with a less number of persons.

In a further preferred embodiment of the present invention, door lock means is provided for locking the door of the vehicle and door lock releasing means is further provided responsive to the state detecting means and the using state selecting means for releasing the door locked state of the door lock means when the predetermined undesired state of the device is not detected by the state detecting means and the non-using state of the vehicle is selected by the using state selecting means. As a result, the door lock is prevented from being released when the predetermined undesired state of the device is detected in the non-using state of the vehicle, whereby the driver is much more notified of his negligence and is much more encouraged to take any necessary step to preclude the above described predetermined undesired state of the auxiliary device.

Accordingly, a principal object of the present invention is to provide an alarming apparatus in a vehicle, wherein an alarm is raised outside the vehicle when a driver leaves a vehicle while an auxiliary device for implementing an auxiliary function of the vehicle is left in a predetermined undesired state, whereby the driver is notified of his negligence to take any step to preclude such predetermined undesired state of the auxiliary device and is encouraged to take any necessary step to preclude such predetermined undesired state of the auxiliary device.

Another object of the present invention is to provide an alarming apparatus in a vehicle, wherein an alarm is raised with a minimized trouble to the people in the vicinity of a vehicle when a driver leaves the vehicle with an auxiliary device for implementing an auxiliary function of the vehicle left in a predetermined undesired state.

A further object of the present invention is to provide an alarming apparatus suited for vehicles in a rental system, wherein a driver is notified of his negligence to take any necessary step to preclude a predetermined undesired state of an auxiliary device for implementing an auxiliary function of the vehicle when he leaves the vehicle.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a view showing a recording format of a recording card;

FIG. 4 is a block diagram showing in more detail a rental system of vehicles wherein the present invention can be advantageously employed;

FIGS. 9A and 9B are schematic diagrams of a preferred embodiment of the present invention.

DESCRIPTION OF THE PREFERRED EMBODIMENTS

Figure 1:
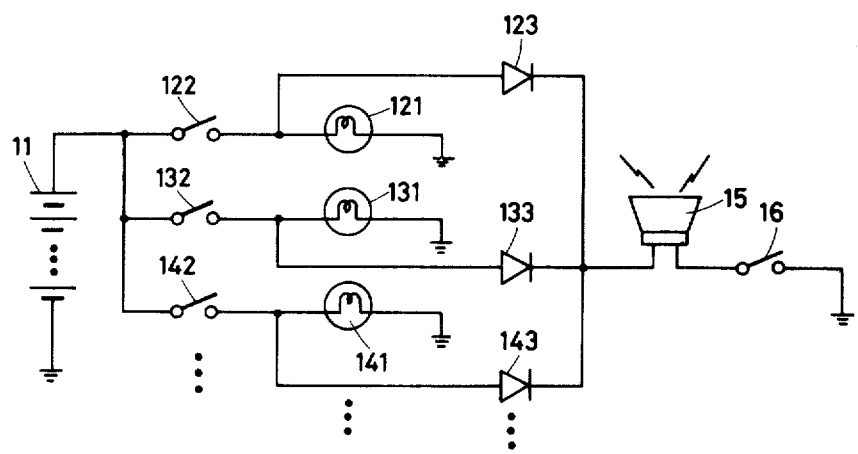
FIG. 1 is a schematic diagram of a conventional negligence alarming apparatus for notifying negligence to turn off a circuit for electrical equipment.
Figure 2:
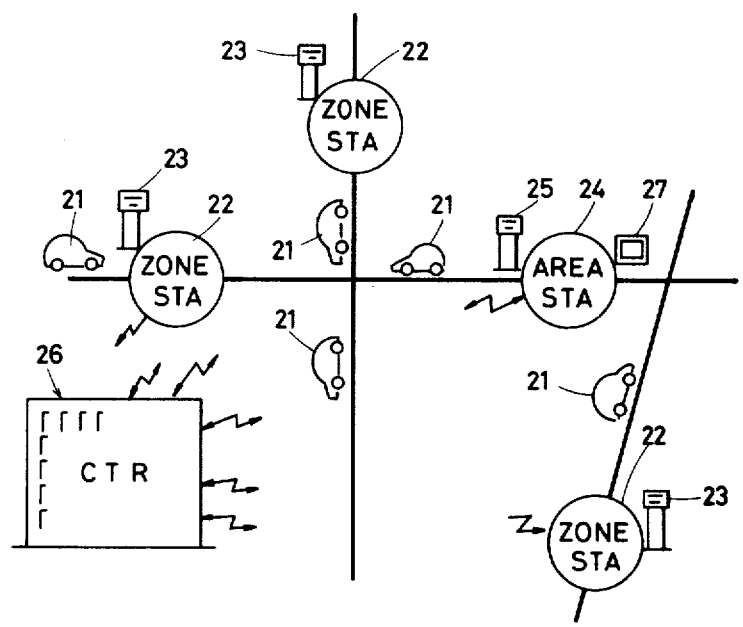
FIG. 2 is a block diagram showing a general idea of a rental system of vehicles wherein the present invention can be advantageously employed.

FIG. 2 is a block diagram showing the fundamental concept of a rental system of vehicles wherein the present invention can be advantageously employed. The rental system shown is adapted to enhance the utilization efficiency of the vehicles and to save manpower required for administration of the vehicles by the use of the information communication technology and the computer technology. The rental system shown comprises a plurality of zone stations 22 provided within a specified area, such as a specified area of a given community in a town, a compound of a factory, or the like. Each zone station is provided with a space for pooling a relatively small number of vehicles 21 for rental. Each zone station 22 is also provided with a station box 23. The station box 23 comprises a terminal for administering rental of the vehicles 21 allotted to the corresponding zone station 22 which is coupled to a center station 26 for communication of data necessary for rental of the vehicles through a communication line. An area station 24 may be provided in an area where the number of vehicles being actually rented is relatively large. In such an area station 24 a service man may be allotted for maintainance of the vehicles in addition to provision of a station box 25. The station box 25 may be the same as the station box 23 and may comprise a terminal for communication of data with the center station 26 through a communication line.

A person who desires to have a vehicle rented of such rental system needs entry in a register of the rental system as a member of the rental system so that a verification card may be issued. The registered member is allow to have a vehicle rented using the verification card 28. Referring to FIG. 3, an information recording format of the card 28 is shown. More specifically, the card 28 comprises a magnetically recorded area 282 on the surface of a sheet material 281. The magnetic recording area 282 comprises a plurality of recording regions, such as a region for recording membership identifying information concerning an identification of a member who holds the card 28, a region for recording information concerning an identification of the vehicle when the vehicle is rented to the member, and other regions for recording any information required in such rental system.

FIG. 4 is a block diagram showing in more detail the above described rental system, wherein the station boxes 23 and 25 and the center station 26 are shown in detail. The vehicle 21 is provided with a card reader 211 for reading the information recorded on the card 28. The station box 23 comprises a central processing unit 231, a card reader 232, a display 233, and a modem 234. The station box 25 provided at the above described area station 24 also comprises a central processing unit 251, a card reader 252, a display 253, and a modem 254, as in the case of the station box 23. The modems 234 and 254 provided in the station boxes 23 and 25 are coupled to the center station 26 through a communication line for communication of the data concerned. The station box 25 is also coupled to an information box 27, which comprises a keyboard 271 including a cathode-ray tube display and a line printer 272. The information box 27 is used by a service man at that area station 24 for communication of the data between the area station 24 and the center station 26.

The above described center station 26 also comprises a central processing unit 261. The central processing unit 261 is coupled to a modem 262 and a clock 263. The modem 262 is coupled to the above described modems 234 and 254 of the station boxes 23 and 25 for communication of the data through the communication line. The central processing unit 261 is also coupled to a disk memory 264 and a tape memory 265. The central processing unit 261 is also coupled to a teletypewriter 266 and a keyboard 267 including a cathode-ray tube display for entry of various kinds of information. The central processing unit 261 is further coupled to a tape reader 268 and a line printer 269.

Figure 5:
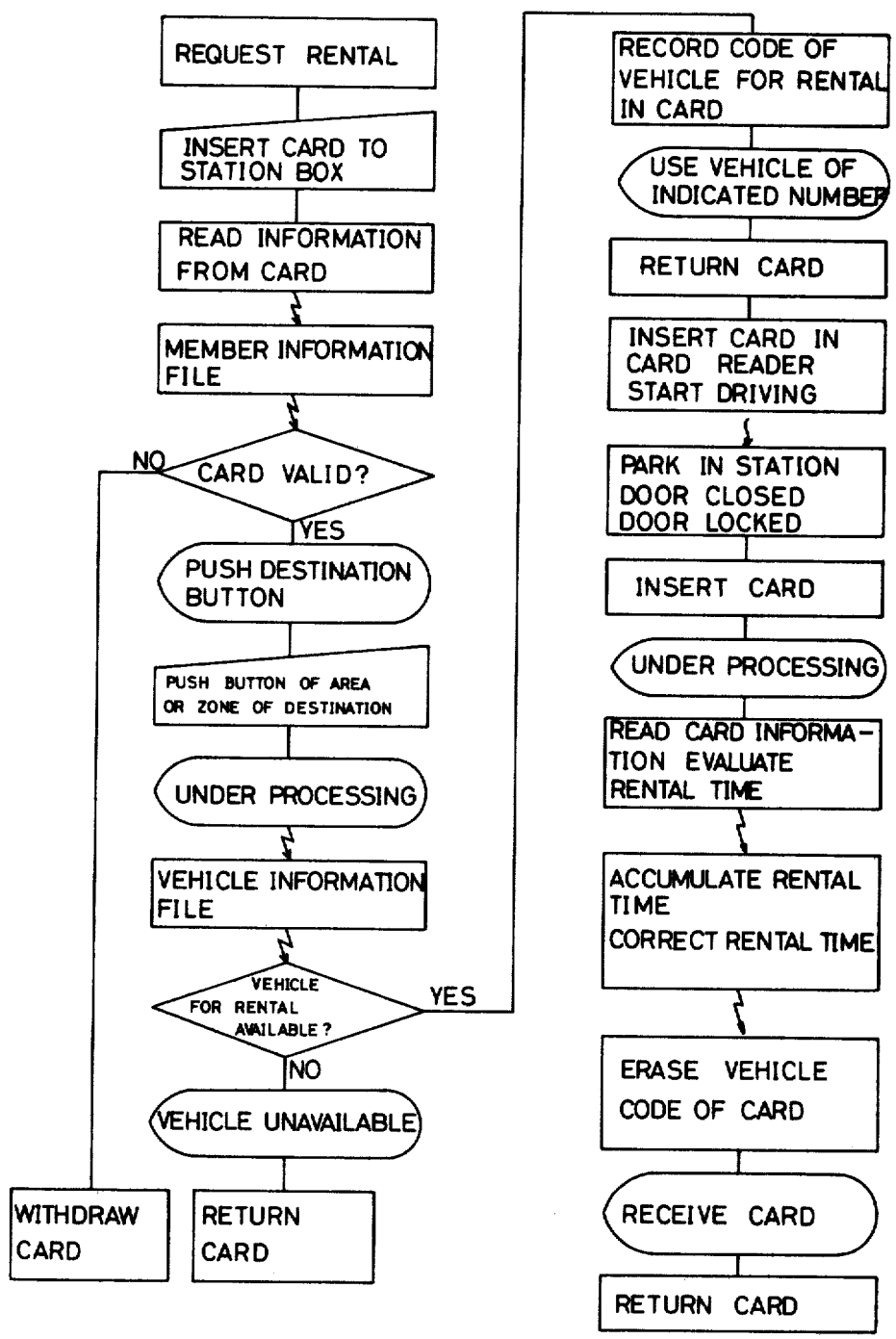
FIG. 5 is flow diagram explaining the FIG. 4 rental system.

FIG. 5 is flow a diagram depicting an operation of the FIG. 4 rental system. Now referring to FIGS. 2 to 5, a series of operations including renting a vehicle and returning the vehicle in the rental system will be described. If and when a member of the rental system desires to have a vehicle rented in the rental system, he first visits the nearest zone station 22. Alternatively, he may visit the area station 24, if the same is nearer to him. Then he inserts the card 28 into a card insertion port, not shown, of the station box 23. The card reader 232 reads the membership identifying information recorded on the recorded area of the card 28 and provides the read information to the central processing unit 231. The central processing unit 231 sends the membership identifying information to the modem 234, which transmits the membership identifying information to the modem 262 of the center station 26 through the communication line. The central processing unit 261 of the center station 26 is responsive to the membership identifying information as received by the modem 262, thereby to retrieve the file of the membership identifying information in advance recorded in the disk memory 264 or the tape memory 265. The central processing unit 261 obtains from the memory 264 or 265 any information required for determining verification of the card as filed in conjunction with the membership identifying information, thereby to determine the verification of the card 28 inserted by the member. Determination of the verification of the card may comprise whether the card is within the effective period of time, whether the driver license of the member is effective, whether the membership fee or the rental fee has been paid, and so on. Upon determination of the verification, the central processing unit 261 provides to the modem 262 information concerning propriety or validity of the card. The propriety information is transferred from the modem 262 through the communication line to the modem 234. The central processing unit 231 in the station box 23 is responsive to the data sent from the center station 26 to determine the propriety or validity of the card, thereby to allow a renting operation only if and when the card is determined as proper or valid. More specifically, upon determination of the card as proper or valid, the central processing unit 231 controls the display 233 to make an indication such as "PUSH DESTINATION BUTTON". Thus the member is instructed to push the destination button of a destination area or zone he wishes to go to, using the vehicle. Accordingly, the central processing unit 231 controls the display 233 to make an indication such as "UNDER PROCESSING". The destination information entered by depression of the destination button is transferred from the central processing unit 231 to the central processing unit 261 of the center station 26. The central processing unit 261 then reads the file of the information concerning the vehicles as pooled in the zone station with which data communication is being made and provides the vehicle information to the central processing unit 231. The central processing unit 231 is responsive to the vehicle information received from the center station to determine availability of a vehicle for rental, i.e. presence or absence of a vehicle which is available for rental. Perferably, determination of availability of a vehicle for rental is made upon retrieval of the file of the vehicle information in consideration of a most efficient utilization of the vehicles determined by a relation of the present position of the vehicles and the destinations of the vehicles being selected. For example, assuming that several vehicles have been pooled in the zone station 22 and some of them are vehicles belonging to or being in custody of other zone stations 22, it would be most efficient to determine a vehicle which is in custody of the destination station 22 or a vehicle of a station which is closest to the destination station 22. If and when there is no vehicle available for rental, the central processing unit 231 controls the display 233 to make an indication such as "NOT AVAILABLE" and controls the card reader 232 to return the inserted card. The central processing unit 231 also controls the card reader 232 to withdraw the card when the card is determined as improper or invalid at the above described step for determining propriety or validity of the card.

When it is determined that a vehicle is available for rental as described above, then the following operation is performed. More specifically, the central processing unit 231 controls the card reader 232 to record a vehicle identifying code identifying a vehicle being rented in a magnetic recording region of the card 28. Then the central processing unit 231 controls the display 233 to make an indication such as "USE THE VEHICLE NO. . . . ". Then the card reader 232 is controlled to return the card 28. The member then receives the card 28 returned from the station box 23 and goes to the vehicle 21 of the number designated to insert the card 28 into a card insertion port of the card reader 211 provided in the vicinity of the door of the vehicle. The card reader 211 reads the information recorded in the card as inserted, thereby to release the door lock of the vehicle. As a result, the member is allowed to open the door and use the vehicle 21. As a result, he can drive the vehicle 21 to the desired destination station.

When he arrives at the zone station 22 or the area station 24 of the destination, he parks the vehicle 21 and be comes out of the vehicle by opening the door and then closes the door. The vehicle has been structured such that the door is automatically locked a predetermined period of time after the closure of the door. The card 28 is then returned from the card reader 211. Therefore, the member receives the card 28 from the card reader 211 and enters the card 28 to the station box 23 provided in the station 22 of the destination. Upon insertion of the card 28, the central processing unit 231 controls the display 233 to make an indication "UNDER PROCESSING". Then the central processing unit 231 is responsive to the information read from the card 28 by the card reader 232 to make an arithmetic operation of a period of time spent by the member for use of the vehicle in the following manner. More specifically, the central processing unit 231 first sends the membership indentifying information read from the card 28 to the central processing unit 261 of the center station 26. The central processing unit 261 makes an operation for evaluating the rented time period by subtracting the rental start time recorded in the file of the membership information from the current time measured by the clock apparatus 263. Then the central processing unit 261 makes accumulation of the utilization time by adding the utilization time at this time to the accumulated utilization time stored in the file of the membership information, whereby the utilization time information is renewed for each rental. On the other hand, the central processing unit 231 controls the card reader 232 to erase the vehicle code as recorded in the card 28. Then the central processing unit 231 controls the display 233 to make an indication "PLEASE RECEIVE CARD", so that the card 28 may be returned from the card reader 232 to the member.

Meanwhile, a vehicle comprises various auxiliary devices for implementing various auxiliary functions of the vehicle, apart from a main function of the vehicle of driving the vehicle for a running operation thereof. Generally such auxiliary devices for implementing various auxiliary functions of the vehicle should not be left in a predetermined undesired state when the vehicle is not used and such is particularly required or imperative in the case of the vehicles in such a rental system as described previously. According to an aspect of the present invention, therefore, the vehicle is adapted such that a driver is reminded of the fact that such auxiliary devices have been left in an undesired state when he ends the use of the vehicle and he leaves the vehicle, whereby his negligence to take any necessary step to preclude such undesired state of the auxiliary devices when the vehicle is not used may be avoided. Typically, the above described auxiliary devices for implementing auxiliary functions of the vehicle may comprise at least one of electrical equipment, a door, a window, a parking brake and a transmission. The electrical equipement in this context means various kinds of lamps that can be lighted even after a key switch is turned off to render the vehicle in a non-using state and may comprise head lights, side lights, parking lights, turn signal lights and so on. Under the circumstances, in the case where the above described auxiliary devices comprise the electrical equipment, by the above described predetermined undesired state of the auxiliary devices when the vehicle is not used, is meant a situation where all such lamps are turned off, thereby to prevent an undesired discharge of the storage battery. In the case where the above described auxiliary devices comprise the doors and the windows, by the above described predetermined undesired state of the devices, is meant a situation where the doors and windows are not fully closed when the vehicle is not used thereby, to leave a risk of theft. In the case where the above described auxiliary devices comprise a parking brake, by the above described predetermined undesired state of the auxiliary devices, is meant a situation where the parking brake is not put on, leaving a possibility of undesired movement of the vehicle. In the case where the above described auxiliary devices comprise a transmission, by the above described predetermined undesired state of the auxiliary devices, is meant a situation where a transmission has been brought to a position other than the neutral position or the parking position, in which case a member who is about to use the vehicle could depress an accelerating pedal without knowing that the transmission has been brought to a position other than the neutral position or the parking position, resulting in a dash of the vehicle which is extremely dangerous.

Figure 6:
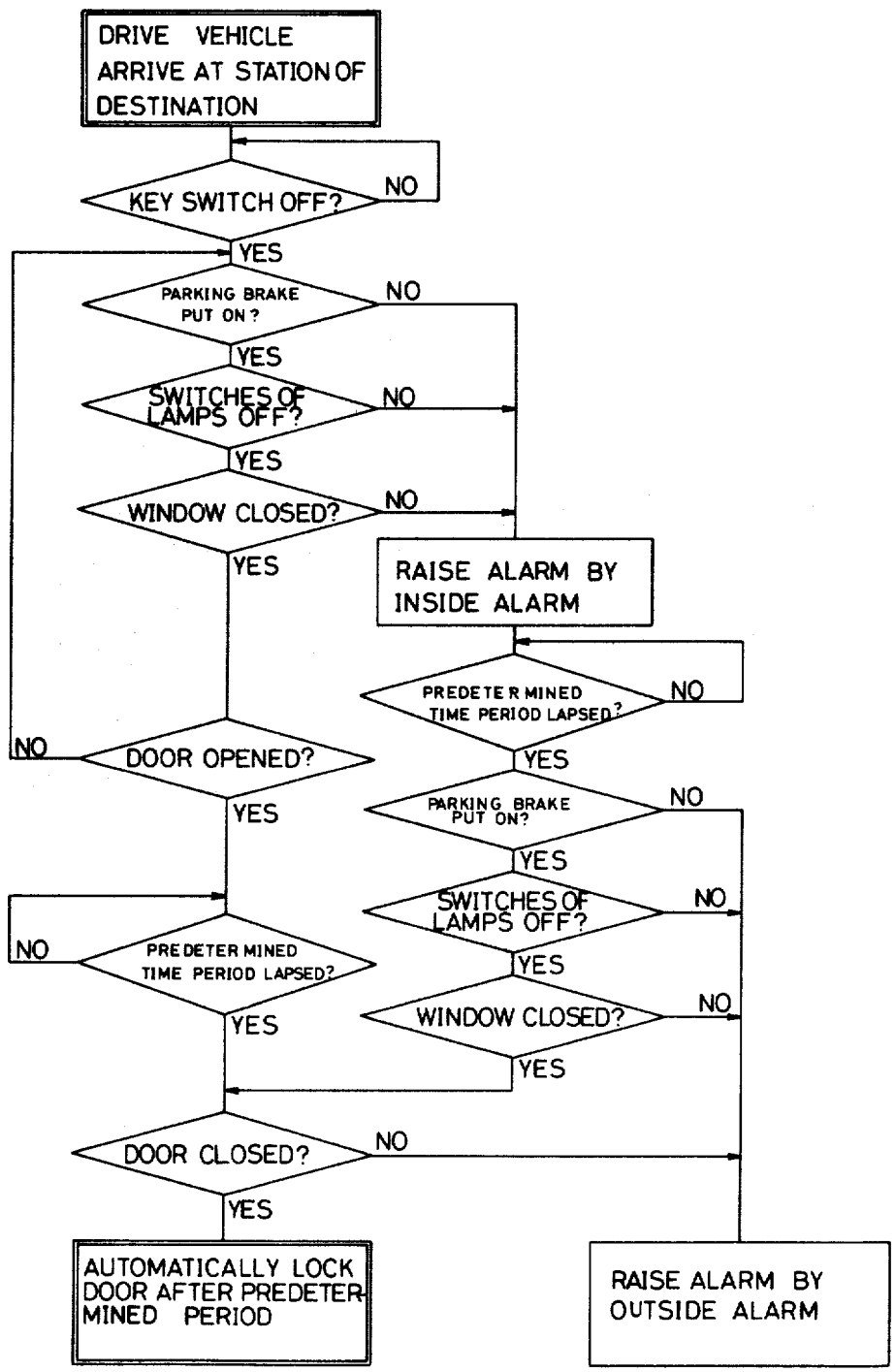
FIG. 6 is a flow diagram explaining the principle of the inventive alarming apparatus in a vehicle.

FIG. 6 is a flow diagram for depicting the principle the inventive alarming apparatus of a vehicle for raising an alarm when the above described predetermined undesired state is left established when the vehicle is not used. When the member arrives at the station of the destination, he first parks the vehicle at a predetermined place and leaves the vehicle. According to the present invention, it is first determined whether the key switch has been turned off. If it is determined that the key switch has been turned off, then it is determined whether the parking brake has been put on. Such determination can be made in the following manner. More specifically, the parking brake comprises an operating lever movable for a predetermined range such that a braking function may be effective when the operating lever is moved beyond a predetermined position in the range. Thus, the above described determination is made by detecting whether the operating lever has not been moved beyond the above described predetermined position. To that end, a switch may be provided so as to be closed when the operating lever is manually pulled. The output of the switch is used to raise an alarm provided inside the vehicle when the parking brake is not put on. If it is determined that the parking brake has been put on, then it is determined whether the above described lamps all have been turned off. If any one of the switches is not turned off, then the alarm provided inside the vehicle is energized. If it is determined that all the switches have been turned off, then it is determined whether the windows have been closed. Such determination can be made in the following manner. More specifically, a switch is provided to be responsive to the end of the window glass when the window glass is fully closed. The output of the switch is used to raise the alarm provided inside the vehicle when the window glass has not been closed. If and when voluntarily or upon being notified by the alarm the member puts the parking brake on, turns all the lamp switches off, and closes the windows, then it is determined whether the door has been closed. To that end, a switch is provided in association with the doors, so that the output is obtained from the switch when the doors have not been closed. If it is determined that the doors have not been opened, i.e. the doors have been closed, then the step for determining whether the parking brake has been put on is repeated, whereupon the above described determining steps are repeated until the door is opened next time. A predetermined period of time after the door is opened, it is then determined whether the door is closed. Unless the door is closed within that predetermined period of time, next time an alarm provided outside the vehicle is energized.

If and when the driver does not notice an alarm raised by the alarm provided inside the vehicle or he neglects to take any necessary step to preclude the above described predetermined undesired state of the auxiliary device even when he notices the alarm by the alarm provided inside the vehicle, then a predetermined period of time, say five seconds, thereafter the same determinations as the previously described determinations are made in succession as to whether the parking brake is put on, whether the various lamp switches are turned off, whether the window is closed, and so on. If and when it is determined at any of the above described determinations that the above described predetermined undesired state is still left, then the alarm provided outside the vehicle is energized, whereby the driver is again reminded of his negligence. On the contrary if it is determined at the above described determinations that the above described predetermined undesired state has been precluded in the parking brake, various lamp switches, and the window, then it is further determined whether the door has been closed. If and when the door has not been completely closed, then the alarm provided outside the vehicle is energized to raise an alarm to the driver. Thus, when voluntarily or upon being notified by the alarm the driver closes the door, this means that the above described predetermined undesired state has been precluded in all of the above described auxiliary devices for implementing auxiliary functions of the vehicle. A predetermined period of time thereafter, the door is automatically locked. Although in the foregoing description the above described auxiliary devices were limited only to the parking brake, the various lamps, the window, and the door, only for simplicity of description, it is unnecessary to say that determination may be made as to whether the transmission is in the above described predetermined undesired state, and so on. Such predetermined undesired state of the transmisson comprises a non-neutral position and/or a non-parking position, depending on the structure of the transmission.

Figure 7A:
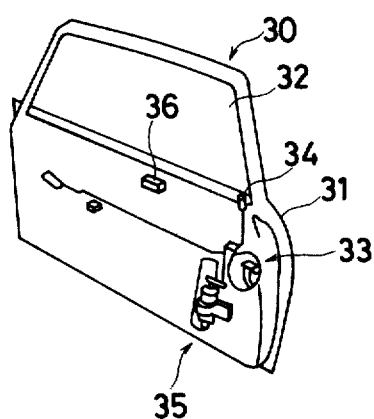
FIG. 7A is a view showing in detail a door of the vehicle.
Figure 7B:
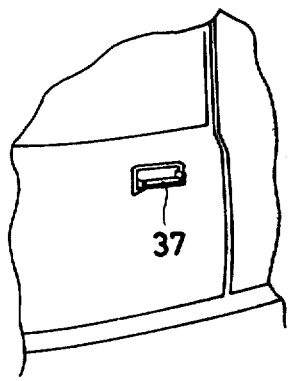
FIG. 7B is a perspective view of a card insertion port provided at a portion of the vehicle.
Figure 8A:
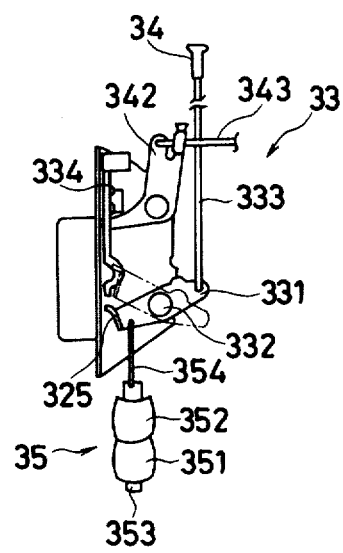
FIGS. 8A and 8B are views showing in detail a door lock mechanism and a solenoid for door locking or door lock releasing.
Figure 8B:
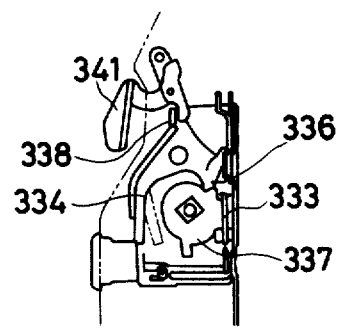

Now a structure of the door and a door lock mechanism of the vehicle will be described in detail. FIG. 7A is a perspective view of the door as viewed from the inside and and FIG. 7B is a perspective view of a card insertion port provided at a portion of the vehicle. FIG. 8A is a plan view of the door lock mecahnism as viewed from the outside of the door and FIG. 8B is a side view of the FIG. 8A door lock meachanism. Referring to FIG. 7A, the door 30 is formed of a window at the upper half portion of a door frame 31 and a window glass 32 is provided to be movable upward and downward. The door 30 is further provided with a door lock mechanism 33. The door lock mechanism 33 may be of a conventional type and is shown in detail in FIGS. 8A and 8B. The door lock mechanism 33 comprises a lever 331 which is pivotally mounted on a shaft 332. One end of the lever 331 is coupled through a rod 333 to a door lock knob 34. The other end of the lever end 331 is formed of a protrusion 335 for restricting the movement of a ratchet pole 334. The ratchet pole 334 is pivotally mounted and is formed at the other end thereof of a claw 336. The claw 336 is selectively engaged with the ratchet wheel 337. The ratchet pole 334 is further formed, at the upper portion thereof, of a protrusion 338 for engagement with an outside hand 341. The ratchet pole 334 is further formed of an aperture for engagement with a lever 342. The lever 342 is engaged through a rod 343 with an inside handle, not shown. In opening the door, the outside handle 341 is pulled or the inside handle is pulled, thereby to rotate the lever 342, whereby the ratchet pole 334 is rotated. At that time, an engaged state of the claw 336 with the ratchet wheel 337 is released whereby the door is allowed to be opened.

In locking the door, the knob 34 is depressed, so that lever 331 is rotated as shown by the two dotted line in FIG. 8A. As a result, the protrusion 335 of the lever 331 restricts the movement of ratchet pole 334, whereby an engagement of the claw 336 of the ratchet pole 334 with the ratchet wheel 333 is established. Therefore, even if the outside handle 341 or the lever 342 is rotated, the ratchet pole 334 and the ratchet wheel 337 are prevented from being rotated, whereby a door locked state is established.

Meanwhile, the door lock mechanism for use in the embodiment of the present invention is also adapted for automatically establishing a door locked state and releasing the door locked state and to that end comprises electrically driven solenoid 35 as well as the manually operable knob 34. Thus, the door can be brought to a locked state or a released state both manually and automatically. The electromagnetic solenoid 35 may comprise a double action type solenoid. More specifically, electromagnetic solenoid 35 comprises a first solenoid 351 and a second soleoind 352. Upon energization of the solenoid 351 a plunger 353 is attracted downward, so that the lever 331 is rotated counterclockwise by means of rod 354 coupled to the plunger 353, whereby the locked state is released. On the other hand, upon energization of the solenoid 352, the plunger 353 is attracted upward, whereby the other end of the lever 331 is pushed upward by the rod 354, thereby to rotate clockwise the lever 331, whereby a locked state is electrically established.

For the purpose of detecting an opened/closed state of the window glass 32, the window closure detecting switch 36 is provided. The window closure detecting switch 36 comprises an actuator, which is positioned to be actuated by the window glass 32. More specifically, the window closure detecting switch 36 is provided at the position slightly lower than the lower end of the window glass when the window glass 32 is completely closed.

Referring to FIG. 7B, the rear door is formed, on the outside surface thereof, of a card insertion port 37 for insertion of the card 28 to the card reader. Thus, the above described card reader 211 is provided inside the card insertion port 37.

FIGS. 9A and 9B show a schematic diagram of a preferred embodiment of the present invention. Referring to the figures, a state detection circuit 40 comprises a plurality of switches 411 to 415, a window switch 36, a first detection circuit 42, an OR gate 44, and a second detection switch 45. The switch 411 is a door switch which is structured to be closed when the door 30 is opened to determine the above described predetermined undesired state of the door 30. The switch 412 is a parking switch, which is structured to be closed when the parking brake is not put on to determine the above described predetermined undesired state of the parking brake. Thw switch 413 is a switch for selecting a lighted state of the head light 131. Thw switch 414 is a switch for selecting a lighted state of the side light 131. The switch 415 is a switch for selecting a lighted state of the parking light 132. The first detection circuit 42 comprises an OR gate including diodes 421 to 425 connected in an OR manner and corresponding to the above described switches 411 to 415. The first detection circuit 42 is provided to detect the closed state of those switches. It is noted that the switches 411 to 415 have been connected closer to the ground as compared with the circuit components concerned. In such a case the diodes 421 to 425 for the OR gate must be connected in such a polarity that a current flows from the diodes to the switches. On the other hand, depending on the nature of the circuit components concerned, some switches are preferably connected closer to the voltage source and the components are preferably connected closer to the ground. In such a case, the second detection circuit 45 is provided to detect the closed state of such switches connected closer to the voltage source as compared with components such as lamps. In the following, a description will be made of the case where the respective switches are connected closer to the ground.

As previously described, according to the aspect of the present invention, it is adapted such that an alarm is raised when the above described predetermined undesired state is established in any of the auxiliary devices for implementing auxiliary functions of the vehicle, when the vehicle is not used. For the purpose of detecting a non-using state of the vehicle, the key switch 46 is used. More specifically, the state of the key switch 46 is closely related to a using state or a non-using state of the vehicle, inasmuch as the key switch 46 is originally intended to select a using state or a non-using state of the vehicle. Therefore, for the purpose of the present invention, the key switch 46 may be used as a using state selecting means. However, for the purpose of the present invention, the using state selecting means may be a maganetic recording card, when the vehicle is structured to be responsive to the card including information associated with the vehicle for permitting the use of the vehicle. For example, such a card may contain information concerning permissibility of the use of the vehicle as magentically recorded, as coded by a combination of punched holes, and so on. In such a case, a card reader 461, a relay coil 462 and a relay contact 463 are provided. The card may further contain information concerning verification of the card or the card holder. If and when the permissibility or the verification of the card being inserted into the card reader 461 is determined, the relay coil 462 is energized and the relay contact 463 is closed, whereby the vehicle is turned to a using state.

The NOR gate 51 provides the high level output when the output of the state detection circuit 40 is the low level and the parking switch 412 is closed. The NOR gate 52 serves to detect a situation where an alarm is to be raised, based on the fact that the key switch 46 is turned to a non-using state and the output of the NOR gate 51 is the low level. The NOR gate 53 serves to detect a situation where the door is to be locked based on the output of the NOR gate 52 and the output of a timer circuit 75 to be described subsequently.

A driver circuit 61 is aimed to drive a first alarm 610 provided to raise an alarm inside the vehicle based on the high level output of the NOR gate 52. The alarm 610 is provided on a control panel comprising various meters, for example, and may comprise a buzzer producing an alarming sound or a lamp for emitting an alarming light. The driver circuit 610 and the above described NOR gates 51 and 52 constitute a first alarm control means.

A driver circuit 62 is designed to drive a second alarm 620 so as to raise an alarm outside the vehicle. The delay circuit 63 is provided to provide the high level output with a delay as compared with a high level output of the NOR gate 52 for the purpose of enabling the second alarm 620 to raise an alarm outside the vehicle a predetermined period of time after an alarm was raised by the first alarm 610 inside the vehicle. The driver circuit 62 and the delay circuit 63 constitute the second alarm control means.

A door lock releasing circuit 71 is aimed to release the door locked state responsive to the high level output of the above described NOR gate 51 and the low level output from the key switch 46 representing that the key switch 46 is in an opened state, i.e. the vehicle is in a using state. The door lock driving circuit 74 is provided to energize the above described door lock solenoid 352. A holding circuit 73 is provided to energize the solenoid 352 for a predetermined time period responsive to the high level output of the above described NOR gate 53. A timer circuit 75 is provided to provide a delay signal determining a predetermined period of time after the door is closed until the door is locked.

For the purpose of releasing the door locked state responsive to the output of the card reader 211 provided in the vehicle 21, a coil 212 is provided to be energized responsive to the output of the card reader 211 and a contact 213 is also provided to be closed upon energization of the coil 212. The contact 213 is connected between the voltage source and solenoid 351. Upon closure of the contact 213, the solenoid 351 is energized separately from the door lock releasing circuit 71.

Now in the following an operation of the embodiment will be described in detail. First of all a state of the vehicle 21 before the same is used is described. In such a state, since the above described various auxiliary devices for implementing various auxiliary functions of the vehicle have been brought to preclude the above described predetermined undesired state, all the switches associated with such devices have been opened, while the vehicle is not used. More specifically, the key switch 46 has been opened, the parking switch 412 has been opened, the door switch 411 and the window detection switch 36 have been opened and the switches 313 to 315 for selecting the using state of the electrical equipment have been opened. In such a state, since any of the diodes 421 to 425 of the first detection circuit 42 is not rendered conductive, the anode terminal of the diodes 421 to 425 becomes the high level. The high level output is inverted by the inverter 432 to the low level. If and when the output of the second detection circuit 42 is also the low level at that time, the low level output is obtained from the OR gate 44 and is applied to one input of the NOR gate 51. At that time the other input of the NOR gate 51 has been supplied with the low level due to the closure of the parking switch 412. Therefore, the NOR gate 51 provides the high level, which is applied to the input terminal 711 of the door lock releasing circuit 71 and is also applied to one input of the NOR gate 52. Therefore, the output of the NOR gate 52 becomes the low level without regard to the opening of the key switch 46 and as a result no alarm enabling signal is provided.

Now consider a case where the member or the driver uses the vehicle of the rental system. The driver inserts the card 28 to the station box 23, whereby the information concerning the vehicle which is available is recorded in the card 28. The driver then inserts the card having the number of the available vehile 21 recorded as designated into the card insertion port 37 of the vehicle 21 designated. Accordingly, the card reader 211 reads the vehicle identifying information of the card 28. If and when the permissibility and the verification of the card are determined, the relay coil 212 is energized for a predetermined period of time. Therefore, the relay contact 213 is closed for a predetermined period of time and the solenoid 351 is energized, whereby the door locked state is released. As a result, the driver is allowed to open the door 30 and enter in the vehicle. Upon opening of the door 30, the door switch 411 is closed, so that a current flows through a resistor 431, a diode 421 and the door switch 411 from the voltage source +V and as a result a potential at the junction of the resistor 431 and the anodes of the diodes 421 to 425 of the first detection circuit 42 becomes the same potential as the ground potential, i.e. the low level. Accordingly, the high level output is obtained from the inverter 432 and is applied through the OR gate 44 to one input of the NOR gate 51. The NOR gate 51 inverts the output thereof to the low level, which low level output is applied to the input terminal 711 of the door lock releasing circuit 71 and the NOR gate 52. Since the output of the NOR gate 51 is the low level at that time, however, the door lock release circuit 71 does not energize the solenoid 351.

On the other hand, since the key switch 46 has not been turned to a using state, the NOR gate 52 receives the low level at both inputs and hence the output of the NOR gate 52 is the high level. The high level output is applied through the resistor 611 to the transistor 612 and 613, thereby to render them conductive. Accordingly, the relay coil 614 is energized and the relay contact 615 is closed. Therefore, a voltage is applied through the relay contact 615 to the alarm 610. The alarm 610 is thus enabled to raise an alarm, thereby to notify the driver of the fact that the door is in an opened state. At the same time, an electric charge stored in a capacitor 751 included in a timer circuit 75 is discharged through a resistor 752, a diode 753 and the door switch 411, whereby the terminal voltage of the capacitor 751 decreases. At that time the inverter 754 comes to provide the high level output, when the terminal voltage of the capacitor 751 becomes lower than a predetermined voltage, and the high level output is applied to one input of the NOR gate 53. Accordingly the output of the NOR gate 53 becomes the low level and an electric charge stored in a capacitor 731 included in a holding circuit 73 is discharged.

When the driver rides on the vehicle and closes the door, the door switch 411 is opened. Accordingly, the output of the inverter 432 and thus the output of the OR gate 44 becomes the low level. The low level output is applied to one input of the NOR gate 51. In such a state, since usually the parking brake has not yet been released, the parking switch 412 remains closed. Accordingly, the low level signal is applied to the other input of the NOR gate 51. Since the NOR gate 51 still receives the low level signal at both inputs, the high level output is obtained therefrom. Accordingly, the NOR gate 52 serves to invert the output to the low level. Therefore, the transistors 612 and 613 of the driving circuit 61 are turned off, whereby the relay contact 615 is opened, thereby to terminate the alarm being raised by the alarm 610.

Since, the output of the inverter 755 becomes the high level, the capacitor 751 starts charging with a predetermined time constant determined by a capacitor 751 and a resistor 756. When the terminal voltage of the capacitor 751 reaches a predetermined voltage, the output of an inverter 754 turns to the low level, which low level output is applied to one input of the NOR gate 53. The other input of the NOR gate 53 is supplied with the low level output of the NOR gate 52. Therefore, the NOR gate 53 turns the low level output of the inverter 754 to the high level. The high level output of the NOR gate 53 is applied to transistors 741 and 742 included in the driver circuit 74 through a resistor 732 included in the holding circuit 73, thereby to render the transistors 741 and 742 conductive, whereby a relay coil 743 is energized. Accordingly, a relay contact 744 is closed and the solenoid 352 is energized, whereby the door is locked. At that time, the high level output of the NOR gate 53 is applied through a resistor 733 to a capacitor 731, thereby to charge the same. The terminal voltage of the capacitor 731 increases with the time constant determined by the capacitance of the capacitor 731 and the resistance of the resistor 733. If and when the terminal voltage of the capacitor 731 reaches the Zener voltage of a Zener diode 734, the transistor 736 is turned on by the charging voltage of the capacitor 731, whereby the base input terminal of a transistor 741 is brought to the ground potential. Accordingly, the transistors 741 and 742 are turned off. Thus, once the door is locked, the door locked state is maintained without the solenoid 325 being continuously energized, thereby to prevent a damage of the solenoid 352 by a heat and decrease a power loss. Thus, after the door is locked, the driver can drive the vehicle.

When the driver arrives at the zone station or the area station of the destination, he leaves the vehicle to return the vehicle. In the following, therefore, an operation in conjunction with the driver leaving the vehicle will be described, inasmuch as the same is one of the features of the present invention.

Now a description will be made of a case where the driver neglects to bring the auxiliary devices to preclude the above described predetermined undesired state. For example, in a case where the driver neglects to turn off the side light, the switch 414 remains closed. In such a state, the output of the inverter 432 becomes the high level and the low level output is obtained from the NOR gate 51. When the driver turns the key switch 46 to a non-using state of the vehicle, then the output terminal of the key switch 46 becomes the low level. Accordingly, the high level output is obtained from the NOR gate 52, so that the driver circuit 61 is enabled as in the case of the operation in his entering into the vehicle, whereby the alarm 610 is energized to raise an alarm. The door lock releasing circuit 71 does not automatically release the door locked state, inasmuch as the output of the NOR gate 5 is the high level.

Now a description will made of the case where the driver leaves the vehicle while he takes any necessary step to preclude the above described undesired state of the auxiliary devices. In leaving the vehicle after the use of the vehicle, voluntarily or upon being notified of his negligence by the alarm raised inside the vehicle, he turns off the switches for selecting the electrical equipment, puts the parking brake on, and turns the key switch 46 to a non-using state. Thus, the driver takes any necessary step to preclude the above described predetermined undesired state of the auxiliary devices of the vehicle. In such a case, the output of the NOR gate 51 is the high level, and the output of the key switch 46 is the low level. Therefore, the high level output is not obtained from the NOR gate 52 and hence the alarm 610 is not energized by the driver circuit 61. The high level output of the NOR gate 51 is inverted into the low level by the inverter 713 and is applied to the NOR gate 714, whereby the high level output is obtained from the NOR gate 714. The high level output from the NOR gate 714 is applied through the resistor 715 to the capacitor 716, whereby the capacitor 716 is charged, while the transistor 717 is turned on. Accordingly, the transistor 718 is turned on and the relay coil 719 is energized. Accordingly, the relay contact 720 is closed and the door locked state is released upon energization of the solenoid 351. When the capacitor 716 is charged to a voltage required for rendering the Zener diode 721 conductive, the Zener diode 721 is rendered conductive and the transistor 722 is turned on. As a result, the base electrode of the transistor 717 becomes the low level and the transistors 717 and 718 are turned off. Accordingly, the solenoid 375 is deenergized. Thus, the solenoid 351 is energized only for a predetermined period of time, whereby the door locked state is automatically released.

When the driver opens the door and leaves the vehicle, the door switch 411 is closed. Therefore, as in the case of his entering into the vehicle, as described previously, the output of the NOR gate 52 becomes the high level, whereby the alarm 610 is energized to raise an alarm. At the same time, the capacitors 731 and 751 are discharged. When the driver closes the door thereafter, the door switch 411 is opened again. Accordingly, an alarm raised by the alarm 610 inside the vehicle is terminated. If and when the driver does not fully close the door and leaves the vehicle in the so-called the door half closed state, the door switch 411 remains opened. Therefore the high level output is continually obtained from the NOR gate 52 and accordingly the alarm 610 is continuously energized to raise an alarm inside the vehicle. However, after the door is closed, the driver can hardly notice an alarm raised by the alarm 610 inside the vehicle.

Now consider a case where the driver leaves the vehicle by operating the knob 34, without noticing or disregarding the alarm, in spite of the fact that an alarm has been raised by the alarm 610 inside the vehicle. In such a case after a predetermined period of time, the alarm 620 is energized to raise an alarm outside the vehicle this time. More specifically, after the high level output is obtained from the NOR gate 52, the high level output is obtained from the delay circuit 63 with a predetermined period of time associated with the time constant determined by the resistance of the resistor 632 and the capacitance of the capacitor 631. The high level output from the delay circuit 63 is applied through the resistor 621 to the transistor 622, thereby to turn the same on. Accordingly, the transistor 623 is turned on and the relay coil 624 is energized. As a result, a relay contact 625 is closed and the alarm 620 is energized, thereby to raise an alarm outside the vehicle. Thus, the driver is effectively reminded of his negligence.

If and when the driver notices the alarm and then he completely closes the door 30, then the alarm being raised by the alarm 620 is terminated. Thus, when the driver takes any necessary step to preclude the above described undesired state of the auxiliary devices for implementing auxilairy functions of the vehicle, the output of the NOR gate 52 turns to the low level. Accordingly, the output of the inverter 754 included in the timer circuit 74 becomes the low level. Therefore, the NOR gate 53 provides the high level output, whereby the transistors 741 and 742 are turned on, so that the relay coil 743 is energized. As a result, the relay contact 744 is closed and the solenoid 352 is energized, with the result that the door 30 is electrically locked. After a predetermined period of time required for establishing the door locked state, the terminal voltage of the capacitor 731 exceeds the Zener voltage of the Zener diode 734, whereby the transistor 736 is rendered conductive and the solenoid 352 is prevented from being undesirably kept energized.

After the driver leaves the vehicle, he inserts the card 28 to the card insertion port of the station box 23, so that the rental fee of the vehicle is calculated, whereupon he receives the card as returned. Thus, the rental of the vehicle is ended.

Meanwhile, the NOR gate 714 of the door lock releasing circuit 71 is kept providing the door lock releasing signal of the high level even after the door is closed when the driver leaves the vehicle. In such a case, if the vehicle has been adapted such that the door locked state is also adapted automatically, the door lock signal is obtained from the NOR gate 53 automatically with a predetermined delay associated with the time constant determined by the resistor 756 and the capacitor 751 and there is no problem. However, if the vehicle has been adapted such that the door lock is established manually and only the door lock releasing is made automatically, usually the knob 34 is operated before the door 30 is closed and the door is locked when the door 30 is closed but when the door lock releasing signal is obtained in closing the door, it could happen that the manual door locking can not be made in leaving the vehicle. In order to avoid such inconvenience, therefore, preferably a structure to be described subsequently may be adopted.

Figure 10:
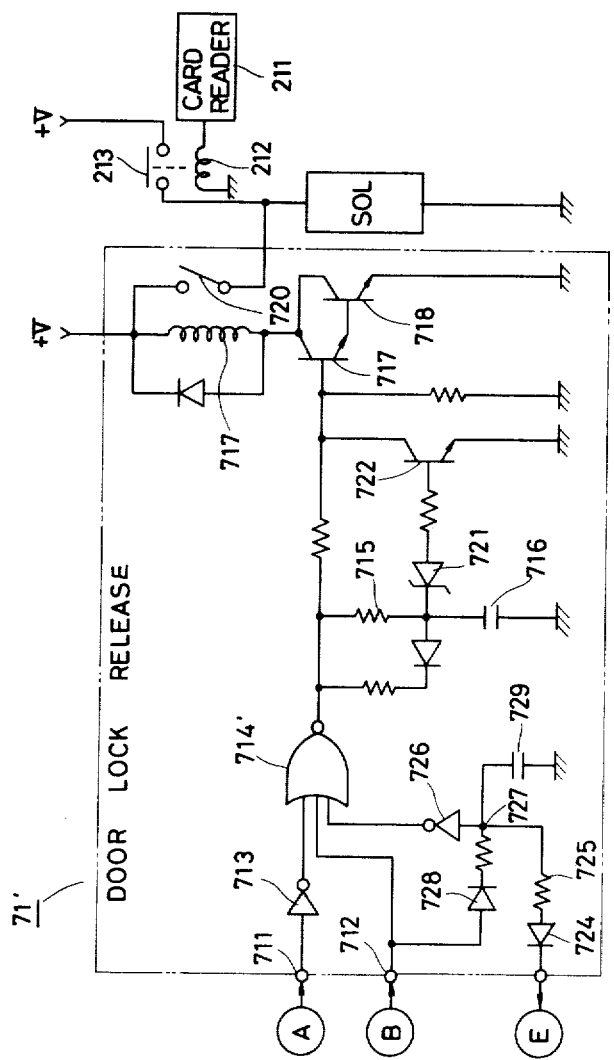
FIG. 10 is a schematic diagram of a modification of the door lock releasing circuit.

FIG. 10 is a schematic diagram of another embodiment of the door lock releasing circuit. The door lock releasing circuit 71' of the embodiment shown employs three-inputted NOR gate 714' in place of the two-inputted NOR gate 714 shown in FIG. 8B, whereby an unnecessary door lock releasing signal is prevented from being obtained. Referring to FIG. 10, the NOR gate 714' is connected to receive the output of the NOR gate 51 through the input terminal 711 and the inverter 713 and also to receive the opening/closing signal of the key switch 46 through a resistor and the input terminal 723 and further to receive the output voltage of the door switch 411 through a diode 724, a resistor 725 and an inverter 726. A diode 728 is connected between the junction 727 of the resistor 725 and the inverter 726 and the input terminal 712. A capacitor 729 is connected between the junction 727 and the ground.

In operation, in a state where the using state of the vehicle is selected by the key switch 46, the capacitor 729 is charged through the key switch 46, the resistor, the input terminal 712 and the diode 728, so that the terminal voltage has become relatively high voltage. Accordingly, the inverter 726 provides the low level output, which is applied to one input of the NOR gate 714'. When the driver turns off the key switch 46 and also turns off the switches of the electrical equipment in leaving the vehicle, the NOR gate 714' provides the high level output. The high level output of the NOR gate 714' serves to release the door locked state as in the case of the previously described operation. Since the driver can leave the vehicle by opening the door, he closes the door after manually operating the knob 34, thereby to lock the door. At that time since the door 30 is once opened, the door switch 411 is closed, so that the electric charge in the capacitor 729 is discharged through the resistor 725, the diode 724, the input terminal 723 and the door switch 411. As a result, the voltage across the capacitor 729 becomes relatively low. As a result, the inverter 726 provides the high level output, which is applied to one input of the NOR gate 714'. Accordingly, even when he closes the door 30 in leaving the vehicle, the door lock releasing signal is preventing from being obtained, and as a result the above described embodiment can be advantageously employed in a vehicle adapted such that the door locked state is automatically released and the door is manually locked.

Although in the foregoing description the inventive alarming apparatus in a vehicle was described as embodied in the vehicles of a rental system, it is pointed out that the present invention can be equally applied to any types of vehicles such as engine automobiles, electric automobiles, hybrid automobiles, and the like of ordinary use, without being limited to those in a rental system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An alarming apparatus in a vehicle including an auxiliary device for implementing an auxiliary function of said vehicle, comprising:
    first alarming means provided to raise an alarm inside said vehicle,
    second alarming means provided to raise an alarm outside said vehicle,
    using state selecting means for selecting a using state or a non-using state of said vehicle,
    state detecting means for detecting a predetermined undesired state of said auxiliary device for implementing an auxiliary function of said vehicle, said predetermined undesired state of said device being undesired in said non-using state of said vehicle,
    first control means responsive to said state detecting means and said using state selecting means for enabling said first alarming means when said predetermined undesired state is detected by said state detecting means and said non-using state is selected by said using state selecting means, and
    second control means for enabling said second alarming means a predetermined period of time after said first alarming means is enabled by said first control means.

2. An alarming apparatus in a vehicle in accordance with claim 1, wherein said auxiliary device for implementing an auxiliary function of said vehicle comprises at least one of electrical equipment, a door openably/closably provided, a window openably/closably provided, a parking brake and a transmission.

3. An alarming apparatus in a vehicle in accordance with claim 2, wherein
    said auxiliary device for implementing an auxiliary function of said vehicle comprises
        said electrical equipment, and
        a switch for selective energization of said electrical equipment, and
    said state detecting means comprises
        conduction state detecting means for detecting a conduction state of said switch.

4. An alarming apparatus in a vehicle in accordance with claim 3, wherein said electrical equipment comprises a lamp.

5. An alarming apparatus in a vehicle in accordance with claim 2, wherein
    said auxiliary device for implementing an auxiliary function of said vehicle comprises said door, and
    said state detecting means comprises door non-closure detecting means for detecting a non-closed state of said door.

6. An alarming apparatus in a vehicle in accordance with claim 5, wherein said door non-closure detecting means comprises a door non-closure responsive switch including an actuator, positioned to be responsive to a non-closed state of said door.

7. An alarming apparatus in a vehicle in accordance with claim 2, wherein
    said auxiliary device for implementing an auxiliary function of said vehicle comprises said window, and
    said state detecting means comprises window non-closure detecting means for detecting a non-closed state of said window.

8. An alarming apparatus in a vehicle in accordance with claim 7, wherein
    said window comprises a window glass movably provided for opening/closing of said window, and
    said window non-closure detecting means comprises a window non-closure responsive switch including an actuator provided to be responsive to a non-closed state of said window glass.

9. An alarming apparatus in a vehicle in accordance with claim 2, wherein
    said auxiliary device for implementing an auxiliary function of said vehicle comprises said parking brake, and
    said state detecting means comprises parking brake non-enablement detecting means for detecting a non-enabled state of said parking brake.

10. An alarming apparatus in a vehicle in accordance with claim 9, wherein
    said parking brake comprises an operating lever movable for a predetermined range such that a braking function may be effective when said operating lever is moved beyond a predetermined position in said range, and
    said parking brake non-enablement detecting means comprises means for detecting that said operating lever has not been moved beyond said predetermined position.

11. An alarming apparatus in a vehicle in accordance with claim 2, wherein
    said auxiliary device for implementing an auxiliary function of said vehicle comprises said transmission, and
    said state detecting means comprises at least one of non-neutral detecting means for detecting that said transmission is in a non-neutral position and non-parking detecting means for detecting said transmission being in a non-parking position.

12. An alarming apparatus in a vehicle in accordance with any one of said preceding claims, which further comprises
    electrical power supply means, and
    electrical circuit components being energized by said electrical power supply means, and wherein
    said using state selecting means comprises key switch means for selectively enabling energization of said electrical circuit components by said electrical power supply means.

13. An alarming apparatus in a vehicle in accordance with any one of the preceding claims 1 to 11, wherein said vehicle is structured to be responsive to an information medium bearing information associated with said vehicle for permitting the use of said vehicle.

14. An alarming apparatus in a vehicle in accordance with claim 13, wherein said information medium is adapted to contain information concerning permissibility of the use of said vehicle.

15. An alarming apparatus in a vehicle in accordance with claim 14, wherein said information medium comprises a magnetic recording medium wherein said information concerning permissibility of the use of said vehicle is magnetically recorded.

16. An alarming apparatus in a vehicle in accordance with claim 13, which further comprises
electrical power supply means, and
electrical circuit components being energized by said electrical power supply means, and wherein
said information medium is further adapted to contain information concerning verification of said information medium, and
said using state selecting means comprises
verification determining means for determining verification of said information medium based on said information concerning verification contained in said information medium,
and
energization enabling means responsive to said verification determining means for enabling energization of said electrical circuit components by said electrical power supply means when said verification of said information medium is determined.

17. An alarming apparatus in a vehicle in accordance with claim 13, wherein said vehicle comprises a vehicle for rental the use of which is permitted based on said information concerning permissibility of the use of said vehicle contained in said information medium.

18. An alarming apparatus in a vehicle in accordance with claim 1, wherein said first alarming means comprises at least one of visual indicating means and suitable sound producing means.

19. An alarming apparatus in a vehicle in accordance with claim 1, wherein said second alarming means comprises audible sound producing means.

20. An alarming apparatus in a vehicle in accordance with claim 2, which further comprises
door lock means for locking said door of said vehicle, and
door lock releasing means responsive to said state detecting means and said using state selecting means for releasing the door locked state of said door lock means when said predetermined undesired state is not detected by said state detecting means and said non-using state of said vehicle is selected by said using state selecting means.

21. An alarming apparatus in a vehicle in accordance with claim 20, wherein
said door lock releasing means comprises electromagnetic means operatively coupled to said door lock means for electromagnetically releasing said door locked state of said door lock means for a predetermined relatively short period of time.

22. An alarming apparatus in a vehicle in accordance with any one of the preceding claims 20 and 21, wherein said vehicle is structured to be responsive to an information medium bearing information associated with said vehicle for permitting the use of said vehicle.

23. An alarming apparatus in a vehicle in accordance with claim 22, wherein said information medium is adapted to contain information concerning permissibility of the use of said vehicle.

24. An alarming apparatus in a vehicle in accordance with claim 23, wherein said information medium comprises a magnetic recording medium wherein said information concerning permissibility of the use of said vehicle is magnetically recorded.

25. An alarming apparatus in a vehicle in accordance with claim 23, wherein
said vehicle comprises a vehicle for rental the use of which is permitted based on said information concerning permissibility of the use of said vehicle contained in said information medium, and
said information medium is further adapted to contain information concerning verification of said information medium, and which further comprises
an insertion port provided in said vehicle for receiving said information medium being inserted therein,
information reading means for reading said information contained in said information medium,
verification determining means responsive to said information reading means for determining the verification of said information medium based on said information read from said information medium, and
release control means responsive to said verification determining means for enabling said door lock releasing means when said verification of said information read from said information medium is determined by said verification determining means.

* * * * *